US011795819B2

(12) United States Patent
Rowe

(10) Patent No.: US 11,795,819 B2
(45) Date of Patent: Oct. 24, 2023

(54) CORRECTION FOR CUTTINGS LAG

(71) Applicant: Halliburton Energy Services, Inc., Houston, TX (US)

(72) Inventor: Mathew Dennis Rowe, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 17/519,999

(22) Filed: Nov. 5, 2021

(65) Prior Publication Data

US 2023/0144743 A1 May 11, 2023

(51) Int. Cl.

| | |
|---|---|
| ***E21B 49/00*** | (2006.01) |
| ***G01N 15/14*** | (2006.01) |
| ***E21B 21/06*** | (2006.01) |
| ***E21B 37/00*** | (2006.01) |
| *G01N 15/10* | (2006.01) |

(52) U.S. Cl.

CPC .......... *E21B 49/005* (2013.01); *E21B 21/065* (2013.01); *E21B 37/00* (2013.01); *G01N 15/14* (2013.01); *G01N 2015/1075* (2013.01); *G01N 2015/1488* (2013.01); *G01N 2015/1493* (2013.01)

(58) Field of Classification Search

CPC ...... E21B 49/005; E21B 37/00; E21B 21/065; G01N 15/14; G01N 2015/1075; G01N 2015/1488; G01N 2015/1493

See application file for complete search history.

(56) References Cited

U.S. PATENT DOCUMENTS

| | | | | |
|---|---|---|---|---|
| 5,165,275 A * | 11/1992 | Donovan | .............. E21B 49/005 250/254 |
| 9,297,225 B2 | 3/2016 | Nesheim et al. | |

(Continued)

FOREIGN PATENT DOCUMENTS

| | | |
|---|---|---|
| CN | 208117762 U | 11/2018 |
| WO | 2016062388 A1 | 4/2016 |
| WO | 2021096876 A1 | 5/2021 |

OTHER PUBLICATIONS

Chien, "Settling Velocity of Irregularly Shaped Particles," *SPE Drilling & Completion*, vol. 9, No. 4, pp. 281-289, Dec. 1994.

(Continued)

*Primary Examiner* — D. Andrews

(74) *Attorney, Agent, or Firm* — Kilpatrick Townsend & Stockton LLP

(57) ABSTRACT

Systems and methods are described for determining the lag time and origin of particles in entrained in a mud stream. A size and shape of the particles may be evaluated at the surface with a visual inspection system, which permits a settling rate to be determined for each of the particles in a non-Newtonian mud stream. Together with an analysis of the pumping schedule, mud properties, trajectory of the wellbore and other fluid dynamics associated with a wellbore operation, an origin of the each of the particles from within the wellbore may be determined. At least one operational parameter for the wellbore operation may be adjusted based on the determined origin of the particles. For example, a clean-out procedure may be initiated if it is determined that particles are settling in an undesirable location in the wellbore.

18 Claims, 4 Drawing Sheets

100

102 Train the controller to estimate a size and shape of particles based on image data.

104 Activate wellbore pumps to circulate a fluid through the wellbore.

106 Record pump schedule.

108 Monitor fluid properties, wellbore trajectory and other properties.

110 Capture image data of particles retrieved from the wellbore.

112 Determine a fluid velocity for a plurality of spatial intervals along the wellbore.

114 Determine a settling velocity for the particles for which image data is captured.

116 Determine a particle velocity from the fluid velocity and the settling velocity.

118 Determine a location of the particles within the wellbore prior to retrieval.

120 Alter at least one parameter of the wellbore operation based on the location determined.

(56) References Cited

U.S. PATENT DOCUMENTS

| | | | | |
|---|---|---|---|---|
| 9,651,468 | B2 | 5/2017 | Rowe et al. | |
| 2016/0370274 | A1* | 12/2016 | Rowe ................. | G01N 15/0205 |
| 2020/0157929 | A1 | 5/2020 | Torrione | |
| 2020/0332654 | A1 | 10/2020 | Rowe et al. | |
| 2021/0047911 | A1 | 2/2021 | Rowe | |

OTHER PUBLICATIONS

Eltilib et al., "Investigation on the Particle Settling Velocity in Non-Newtonian Fluids," *Journal of Applied Sciences*, vol. 11, No. 9, pp. 1528-1535, 2011.

PCT App. No. PCT/US2021/058229, "International Search Report and the Written Opinion", dated Aug. 3, 2022, 8 pages.

* cited by examiner

CORRECTION FOR CUTTINGS LAG

BACKGROUND

The present disclosure relates generally to tools and methods for assessing the effectiveness, safety and other characteristics of a subterranean wellbore operation. More particularly, embodiments of the disclosure include collecting information about particulates carried to the surface by a wellbore fluid during the wellbore operation.

During the drilling of a hydrocarbon-producing well, a drilling fluid or "mud" is continuously circulated from a surface location down to the bottom of the wellbore being drilled and back to the surface again. The returning mud includes particulates such as drill cuttings that may be derived primarily from the formation being penetrated by a drill bit. The particulates may also include geologic material that is eroded or otherwise detached from the surrounding formation at locations in the wellbore other than the bottom of the wellbore engaged by the drill bit. Drilling operators may need to know the lag time, or the time required for the particulates to reach the surface. The lag time may be estimated based on a lag test wherein a known substance is introduced into the drilling fluid and at the surface and subsequently detected at various times and locations along the drilling fluid flow path. Once detected, the lag time may be calculated and expressed in terms of time or pump cycles. In other wellbore operations, particulates carried to the surface may include proppants that return to the surface during or after hydraulic fracturing operations. Ascertaining the origin of the particulates returning to the surface may increase the effectiveness of drilling, pumping, sweeping, and/or, fracturing operations and may help reduce the cost of hydrocarbon recovery operations.

BRIEF DESCRIPTION OF THE DRAWINGS

The disclosure is described in detail hereinafter, by way of example only, on the basis of examples represented in the accompanying figures, in which.

DETAILED DESCRIPTION

The present disclosure describes systems and methods for determining the lag time and origin of particles in entrained in a non-Newtonian mud stream. A size and shape of the particles may be evaluated at the surface, which permits a settling rate to be determined for each of the particles in the mud stream. Together with an analysis of the mud properties, trajectory of the wellbore, a pumping schedule and other fluid dynamics associated with a wellbore operation, an origin of the each of the particles from within the wellbore may be determined. At least one operational parameter for the wellbore operation may be adjusted based on the determined origin of the particles.

Figure 1:
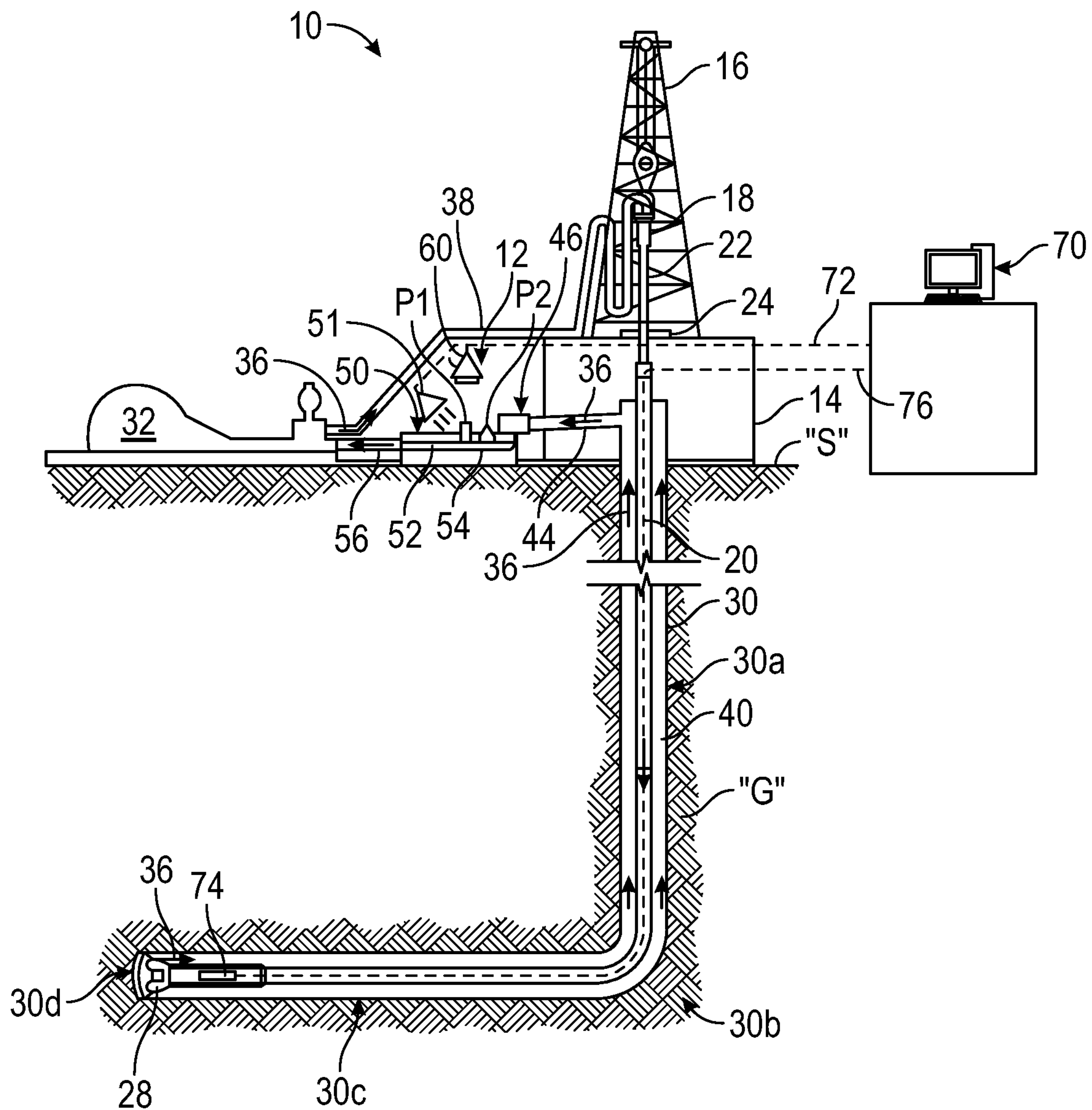
FIG. 1 is a partial, cross-sectional side view of a wellbore drilling system illustrating components for examining wellbore particles and determining an origin of the particles from within the wellbore in accordance with aspects of the present disclosure.

FIG. 1 illustrates a wellbore drilling system 10 with an imaging system 12 in accordance with example embodiments of the present disclosure. The wellbore drilling system 10 includes a drilling platform 14 that supports a derrick 16 having a traveling block 18 for raising and lowering a drill string 20. The drill string 20 may include, but is not limited to, drill pipe and coiled tubing, as generally known to those skilled in the art. A kelly 22 supports the drill string 20 as it is lowered through a rotary table 24. A drill bit 28 is attached to the distal end of the drill string 20 and is driven either by a downhole motor and/or via rotation of the drill string 20 by the rotary table 24. As the drill bit 28 rotates, it creates a wellbore 30. The wellbore 30 penetrates a geologic formation "G" and extends from a surface location "S." While wellbore 30 is illustrated extending from a terrestrial surface location "S," the principles described herein are equally applicable to subsea drilling operations that employ floating or sea-based platforms and rigs, without departing from the scope of the disclosure.

As illustrated, the example wellbore 30 includes a vertical portion 30*a* extending from the surface location "S" to an elbow 30*b*. A horizontal portion 30*c* of the wellbore 30 extends from the elbow 30*b* to a toe 30*d* of the wellbore where the drill bit 28 engages the geologic formation "G." In other embodiments, a wellbore with any other geometry, e.g., deviated, slanted, curved and/or entirely vertical, may employ the systems and methods described herein without departing from the scope of the disclosure.

A pump 32 (e.g., a mud pump) circulates drilling fluid 36 through a feed pipe 38 and to the kelly 22, which conveys the drilling fluid 36 downhole through the interior of the drill string 20 and through one or more orifices in the drill bit 28. The drilling fluid 36 is then circulated back to the surface location "S" through an annulus 40 defined between the drill string 20 and the walls of the wellbore 30. At the surface location "S," the recirculated or spent drilling fluid 36 exits the annulus 40 and may be conveyed through a flow line 44 to one or more fluid processing unit(s) 46. The fluid processing unit 46 may include a shaker table 50 with one or more screens 52 onto which the drilling fluid 36 is deposited for cleaning. Example particles P1, P2 may be separated from the drilling fluid 36 by the one or more screens 52 in view of the imaging system 12. The drilling fluid 36 may pass through the screens 52 into a retention pit 54 where one or more chemicals, fluids, or additives may be added to the drilling fluid 36 before returning to the pump 32 through flow line 56.

The imaging system 12 includes an imaging device 60 focused on the one or more screens 52 or another location where particles P1, P2 separated from the drilling fluid 36 may be visible. The imaging device 60 may include one or more cameras such as a charge coupled device (CCD) camera, or one or more low light or infrared cameras. The imaging device 60 may be employed in conjunction with one or more light sources 62, such as a white light source, an incandescent light source (e.g., a tungsten filament light bulb), an infrared light source, a laser, one or more light emitting diodes (LEDs), or any combination thereof. The imaging system 12 is operably coupled to a controller 70 by a communication cable 72.

The controller 70 may be located at the surface location "S," e.g., on the drilling platform 14 or at another location adjacent the wellbore 30 being drilled. In other embodiments, the controller 70 may be located at a remote location, without departing from the scope of the disclosure. The controller 70 may generally operate to control the collection of data from imaging system 12, to analyze the size and shape of particles P1, P2 any other images or data provided by the imaging system 12. The controller 70 may also be operably coupled to one or more downhole sensors 74 by a communication line 76. The downhole sensors 74 may be provided within a measurement-while-drilling (MWD) or logging-while drilling (LWD) system, and the communication line 76 may include wired connections, mud pulse telemetry or other downhole telemetry systems. The sensors 74 may generally monitor a viscosity, density and other properties of the drilling fluid 36 in real-time and may also provide an indication of the trajectory of the wellbore 30. The trajectory of the wellbore 30 may be derived from data regarding the position and orientation of the drill bit at predetermined intervals or as a continuous data stream. With the information provided through the communication cable 72 and the communication lien 76, as well as any information stored within or otherwise available to the controller 70, the controller may operate to determine an origin of the particles P1, P2 from within the wellbore 30.

Figure 2:
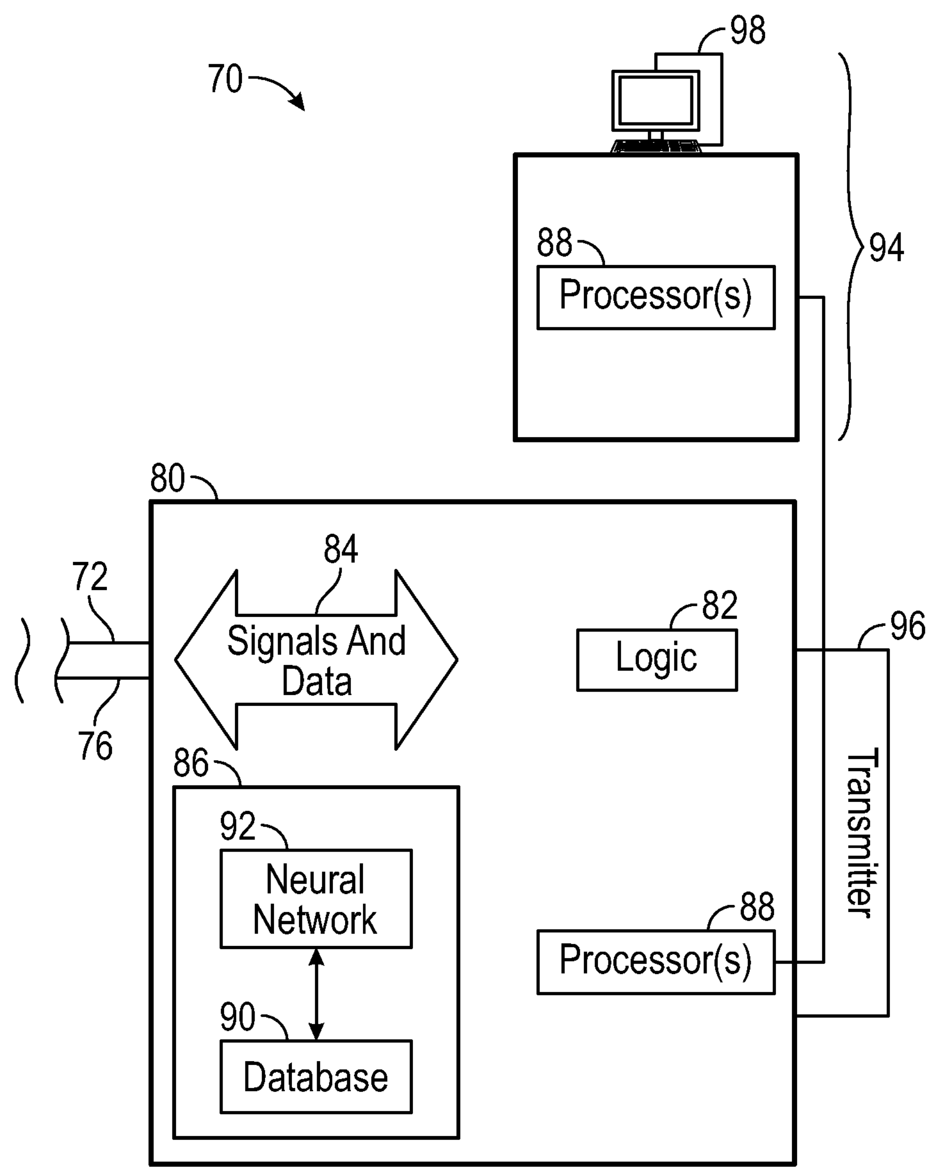
FIG. 2 is a block diagram of a controller of the system of FIG. 1.

Referring to FIG. 2, the controller 70 includes a data acquisition module 80 operably coupled to the communication cable 72 and the communication line 76. The data acquisition module 80 may include logic 82, perhaps comprising a programmable data acquisition module 80. The logic 82 may be employed, for example, to select data 84 from the imaging system 12 (FIG. 1) for processing. In some embodiments, the imaging system 12 may provide data 84 at timed intervals dependent upon the drilling operation (e.g., drilling, circulating, cleaning, etc.). The data 84 may comprise any type of image data including still images and/or video of the particles P1, P2 (FIG. 1) moving across the screens 52 (FIG. 1). Similarly, the logic 82 may be employed to select data 84 provided by the downhole sensors 74 (FIG. 1). The logic 82 of the controller also be may be programmed with an appropriate threshold, for example a predetermined number or distribution of particles identified as having a particular origin in the wellbore, which will cause the controller 70 to adjust a parameter of the drilling operation.

The data acquisition module 80 may further include a memory 86 communicably coupled to one or more processors 88 and may be used to compile or store the acquired data 84, as well as other data, perhaps in an associated database 90. A neural network 92 may be programmed into the memory 86 to assist the processors 88 in ascertaining the size and shape of particles P1, P2. For example, the neural network 92 may be trained prior to deployment using one or more kits or collections of physical training objects of a known shape, size, and volume. Such training objects may include sample physical objects, such as ball bearings, cubes, pyramids, or any three-dimensional objects of a known or determinable shape, size, and volume. In other embodiments, the training objects may include drill cuttings and geologic particles derived from the wellbore 30 and/or adjacent wellbores. A weight and/or density of each of the training objects may be stored in the database 90 to assist processors 88 in ascertaining an estimated density of the particles P1, P2 observed in operation.

The controller 70 may include a remote workstation 94 communicably coupled to the data acquisition module with 80 with a transmitter 96. The transmitter 96 may include any form of wired or wireless telecommunication such as, but not limited to, wires, fiber optics, wireless means (e.g., radio frequency, etc.). In such embodiments, the data 84 may be transmitted to the remote workstation 94 to be processed with associated processors 88 contained therein. The remote workstation 94 may include one or more peripheral devices 98, such as a computer screen, a graphical user interface, a hand-held device, a printer, or any combination thereof. The peripheral devices 98 may provide an operator with a graphical display of the results of processing the data 84, and of an estimated origin of the particles P1, P2 from within the wellbore 30.

Figure 3:
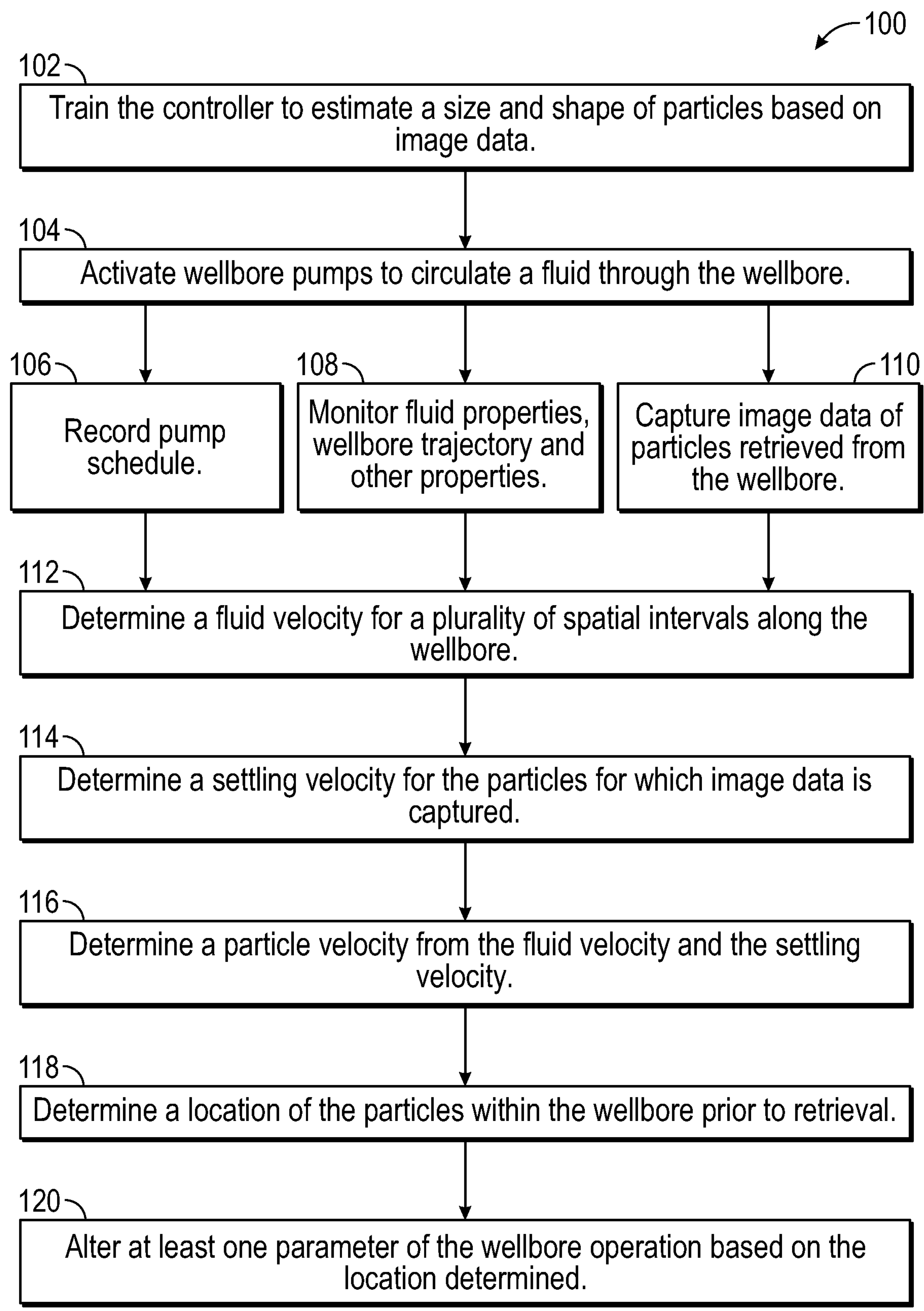
FIG. 3 is a flowchart illustrating a procedure for evaluating and altering a drilling operation based on a determination of the origin of particulates from within the wellbore.

Referring now to FIG. 3, and with continued reference to FIGS. 1 and 2, a procedure 100 for evaluating and altering a wellbore operation based on a determination of the origin of particulates P1, P2 from within the wellbore 30 is illustrated. Initially at step 102, the controller 70 may be trained to estimate a size and shape of particles P1, P2 retrieved from the wellbore 30. For example, the logic 82 may be programmed to take measurements of a plurality of calibration particles with a known size, shape, volume, density and other characteristics and the known characteristics of the calibration particles may be stored in the database 90 for comparison to particles P1, P2 in operation. Any other known data regarding the wellbore operation, for example, well trajectory, mud properties, etc. may be stored in the database to assist in any subsequent analysis.

Next, at step 104, the wellbore pumps 32 are activated to circulate drilling fluid 36 or another wellbore fluid through the wellbore 30. The wellbore pumps 32 may not be running throughout the entire wellbore operation, and thus a pump schedule may be recorded (step 106). The times at which the pumps 32 are deactivated and the times the pumps 32 are running may be recorded along with the speed of the pumps 32. The pump 32 may be operably coupled to controller 70 directly such that the pump schedule may be recorded in the database 90, and/or the pump schedule may be estimated based on image data provided by the imaging system 12, flow rates detected by down hole sensor 74, or the pump schedule may be input manually by an operator at the peripheral device 94. The pump schedule (see FIG. 4) may form a timeline for the wellbore operation. Concurrently with recording the pump schedule, the fluid properties of the drilling fluid 36, the wellbore trajectory, geologic properties surrounding the wellbore 30 may be monitored with the sensors 74 (step 108) and recorded in the database 90. Sensors (not shown) positioned elsewhere along mud stream may also be queried to record values of fluid pressure, flow rate, etc. and recorded in the database 90. Also while the pump schedule is being recorded, image data of particles P1, P2 retrieved from the wellbore 30 are captured by the imaging system 12 (step 110). The images of the particles P1, P2 may be measured by the processor 88 in data acquisition unit 80, and the particles P1, P2 may be categorized by size and shape. For example, measurements may be taken of the particles P1, P2 along multiple axes and in parallel planes such that the particles may be categorized into one or more categories, for example, cubic, spherical, pyramidal. The density, composition and other characteristics of the particles may be estimated based on the characteristics of the most similar calibration particles, for example. The density of the particles may also be estimated based on bulk density and/or neutron density logs or measurements of the geologic formation "G" surrounding the wellbore 30.

Next, at step 112, a fluid velocity $v_f$ of the drilling fluid 36 may be determined for any spatial interval in the wellbore 30, for example the vertical portion 30*a* and the horizontal portion 30*c*. The fluid velocity $v_f$ may be readily calculated with measurements of the annular cross-sectional area of the wellbore portion 30*a*, 30*c* together with the volume pumped through the pumps 32. In some embodiments, an average fluid velocity along the total wellbore is calculated rather than a fluid velocity in any particular interval.

At step 114, a settling velocity $v_s$ is determined for each of the particles P1, P2. In some embodiments, the settling velocity $v_s$ is determined empirically or experimentally, for example using the calibration particles with the particular drilling fluid 36. In other embodiments, the settling velocity $v_s$ may be calculated using equation (1) below or a similar correction.

$$v_s = 120.0\left(\frac{\mu_e}{d\rho_f}\right)\left[\sqrt{1+0.0727d\left(\frac{\rho_p}{\rho_f}-1\right)\left(\frac{d\rho_f}{\mu_e}\right)^2}-1\right] \quad (1)$$

Here $\mu_e$ is an effective viscosity for a non-Newtonian drilling fluid 36, d is a nominal diameter of the particles P1, P2, $\rho_f$ is the density of the drilling fluid 36 and $\rho_p$ is the density of the particles P1, P2. Any similar correction factor may be employed for the settling velocity without departing from the scope of the disclosure.

Next at step 116, a particle velocity $v_p$ for each of the particles P1, P2 may be determined taking into account fluid velocity $v_f$ determined in step 112. The drag, buoyancy, and lift from the fluid velocity $v_f$ may be corrected for the trajectory of the wellbore 30 and compared to the force of gravity in a momentum balance, to calculate particle velocity V.

Once the particle velocity $v_p$ is determined, a location of the particles P1, P2 may be determined (step 118) by back calculating the position of the particle P1, P2 downhole, considering the pump schedule recorded in step 106. An example of the back calculation is described below with reference to FIG. 4. Next, in step 120, at least one parameter of the wellbore operation may be adjusted in response to determining the location of the particles P1, P2. For example, if it is determined that an origin of one of the particles P2 is in an undesirable location in the wellbore 30, the elbow 30*b*, for example, the density of the drilling fluid 136 may be altered to ensure the particles P1, P2 are not accumulating in the wellbore 30. Additionally, or alternatively, the pump rate may be altered, or other remedial actions may be employed.

Figure 4:
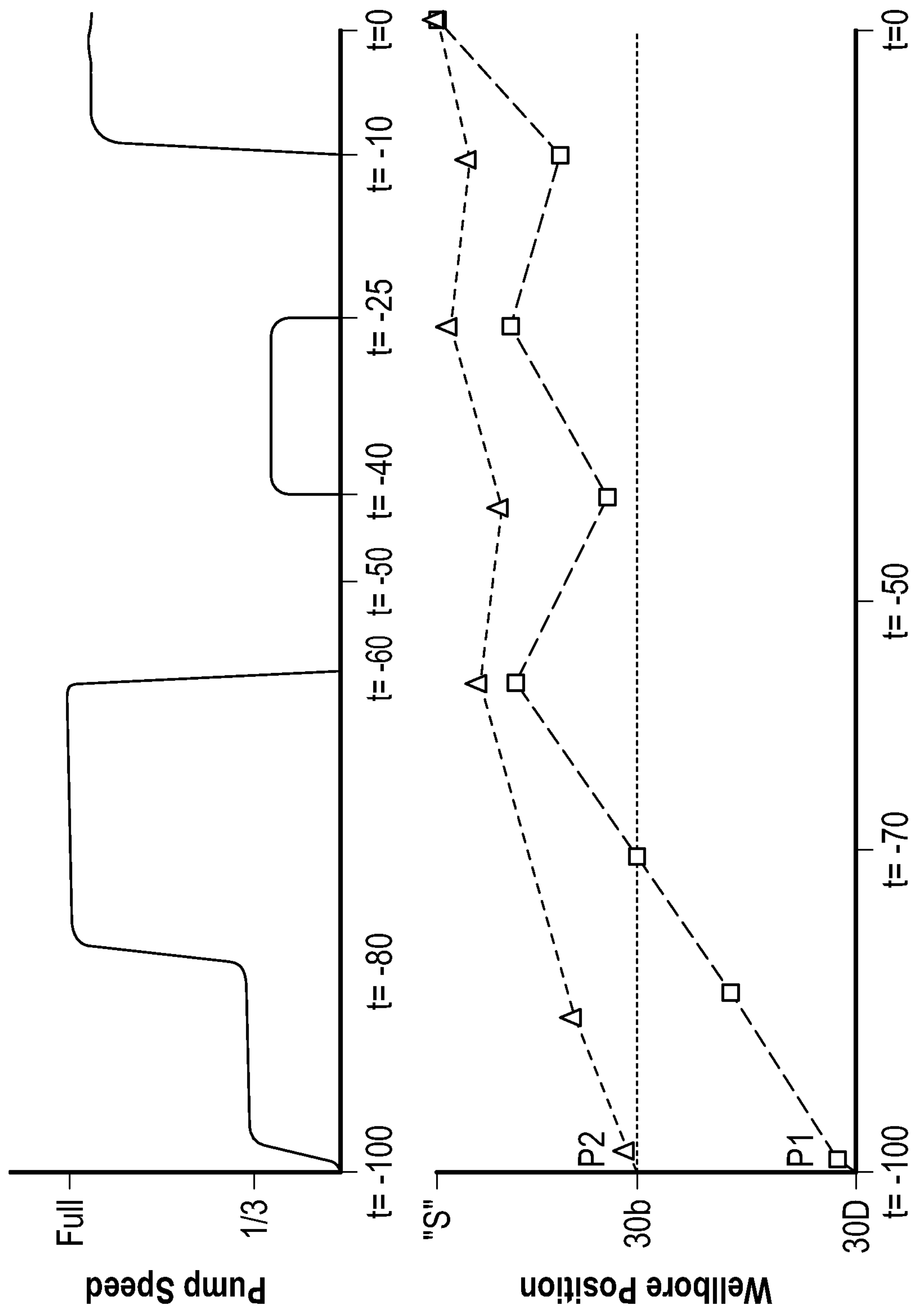
FIG. 4 is a timeline illustrating a pump schedule for a wellbore operation and an estimated position of the particulates within the wellbore during the wellbore operation, which may be determined with systems and methods in accordance with the present disclosure.

Referring now to FIG. 4, a timeline illustrates an example pump schedule along with an estimated position of the particulates P1, P2 within the wellbore 30 during the wellbore operation. The timeline illustrates a time period ending at t=0 when an image of particles P1, P2 are captured by the imaging system 12 at the surface location "S." The beginning of the time period is at t=−100 when the pumps 32 are first activated. In other embodiments, any portion of a wellbore operation and any duration may be recorded for analysis without departing from the scope of the disclosure. The example pump schedule generally indicates that the pumps 32 are run at ⅓ speed from t=−100 to t=−80 and from t=−40 to t=−25, full speed from t=−80 to t=−60 and from t=−10 to t=0 and deactivated from t=−60 to t=−40. The units for time, pump speed and distance within the wellbore 30 are not illustrated in the general example of FIG. 4, as those skilled in the art would readily recognize the manner in which the quantities may be determined.

The pump schedule generally establishes a plurality of time intervals for which a different particle velocity $v_p$ may be determined. The wellbore position also establishes a plurality of intervals for which a particle velocity $v_p$ may be determined. For example, a change in verticality of the wellbore at the elbow 30*b* may establish a boundary between portions of the wellbore with a different degree of verticality, e.g., the horizontal portion 30*c* and the vertical portion 30*a*. As described below, a different particle velocity $v_p$ may be determined for each of the individual interval, and the origin of the particles may be determined by back-calculating a location of the particle at the beginning of each of the intervals from the particle velocity $v_p$ and a known or calculated position at the end of the interval.

From the surface location "S" where both particles P1, P2 were recovered at t=0, a location of the each of the particles P1, P2 may first be calculated at t=−10. The particle velocity, corrected for settling, determined for each of the particles P1, P2 caused by the full speed operation of the pumps 32 while moving through the vertical portion 30*a* of the wellbore 30 can be used to determine a distance traveled by each of the particles over the time interval of t=−10 to t=0. Based on the size and shape of the particles, it may be determined that particle P1 traveled faster than particle P2, and thus, would have been deeper within the wellbore 30 at time t=−10. The location of each of the particles P1, P2 is noted and establishes a reference for calculating a location of the particles for a preceding interval, e.g., from t=−25 to t=−10.

For the time interval from t=−25 to t=−10, the pump schedule indicates that the pumps 32 were not running Thus, the particles P1, P2 may have been settling over this time interval at the settling velocity $v_s$ calculated for each of the particles P1, P2. The settling velocity $v_s$ for each of the particles P1, P2 may thus be used to calculate a location of the particles P1, P2 at t=−25 that is higher in the wellbore 30 than the location calculated at t=−10.

The location of the particles P1, P2 at the beginning of each time interval may similarly be calculated until an origin of the particles P1, P2 is determined at t=−100. For the time interval from t=−40 to t=−25, since the pumps 32 were only operating at ⅓ capacity, the particle velocity $v_p$ may be less than the particle velocity $v_p$ calculated for full speed operation of the pumps 32. At t=−70 it may be determined that particle P1 transitioned from the horizontal portion 30*c* to the vertical portion 30*a* of the wellbore 30. Thus, for the time interval from t=−80 to t=−70 the settling velocity $v_s$ may be discounted as the particle P1 may not tend to settle any significant distance in the horizontal portion 30*c*. Thus, a different particle velocity $v_p$ may be calculated for the time interval from t=−80 to t=−70 than for the time interval from t=−70 to t=−60 even though the pumps 32 may have been operating at full capacity over the entire time from t=−80 to t=−60.

Once the origin of the particles P1, P2 is determined, it may be recognized that particle P1 originated from the toe 30*d* of the wellbore 30 and may have been generated as the drill bit 28 cut into the geologic formation "G." It may be recognized that the particle P2 may have originated at the elbow 30*b*, which may indicate a buildup of particles at the elbow 30*b*. In response to determining the origin of the particles P1, P2, remedial actions may be taken to clean out the wellbore 30 such as changing a characteristic of the drilling fluid 36, altering the pumping rate, or adjusting any parameter the wellbore operation that may remedy the buildup of particles at the elbow 30*b*. In some embodiments, the controller 70 is preprogrammed with instructions to adjust the pumping rate automatically, or to display a proposed response to an operator on the peripheral device 94.

The aspects of the disclosure described below are provided to describe a selection of concepts in a simplified form that are described in greater detail above. This section is not intended to identify key features or essential features of the claimed subject matter, nor is it intended to be used as an aid in determining the scope of the claimed subject matter.

According to one aspect, the disclosure is directed to a method for evaluating and altering a wellbore operation. The method includes (a) circulating a wellbore fluid through a wellbore, the wellbore fluid carrying a plurality of particles originating from within the wellbore, (b) retrieving the particles from the wellbore, (c) measuring the particles to determine a size and shape of the particles, (d) determining a particle velocity for each of the particles within the wellbore from the size and shape determined for each of the particles and from a fluid velocity of the wellbore fluid within the wellbore (e) determining an origin of each of the particles from within the wellbore from the particle velocity determined for each of the particles and (f) adjusting at least one parameter of the wellbore operation in response to the origin determined for at least one of the particles.

In some embodiments, the method may further include capturing image data of the particles with an imaging system coupled to a controller, and wherein measuring the particles may include measuring the particles from the image data with the controller. Determining the particle velocity for each of the particles may include determining a settling velocity for each of the particles with the controller and determining the settling velocity may include characterizing a component of the particle velocity caused by gravity on the particle. In some embodiments, determining the settling velocity may include calculating the settling velocity from the equation:

$$v_s = 120.0\left(\frac{\mu_e}{d\rho_f}\right)\left[\sqrt{1 + 0.0727d\left(\frac{\rho_p}{\rho_f} - 1\right)\left(\frac{d\rho_f}{\mu_e}\right)^2} - 1\right]$$

wherein $\mu_e$ is an effective viscosity for the wellbore fluid, d is a nominal diameter of the particle, $\rho_f$ is the density of the wellbore fluid and $\rho_p$ is the density of the particle. In one or more embodiments, the method further includes estimating the density of the particle by comparing the image data with image data of a plurality of calibration particles of known density stored by the controller.

In one or more embodiments, the method further includes recording a pump schedule including time intervals in which a pump is running to circulate the wellbore fluid and time intervals in which the pump is not running In some embodiments, determining a particle velocity for each of the particles includes determining a particle velocity for each of the particles for each of the intervals and wherein determining the origin of each of the particles includes determining a location of each of the particles at a beginning of each of the intervals from the particle velocity determined for each of the intervals. The method may further include recording a trajectory of the wellbore with the controller, the trajectory indicating a degree of verticality of the wellbore and determining the particle velocity for each of the particles may be based on the verticality of the wellbore. In some embodiments, determining the particle velocity includes correcting the particle velocity in vertical portions of the wellbore such that the particle velocity in the vertical portions of the wellbore is less than the particle velocity in horizontal portions of the wellbore.

In some embodiments, adjusting at least one parameter of the wellbore operation may include initiating a washout procedure. In some embodiments, the washout procedure may be initiated in response to identifying an indication of a buildup of particles win the wellbore.

According to another aspect, the disclosure is directed to a wellbore system. The wellbore system includes a pump fluidly coupled a wellbore and operable for circulating a wellbore fluid through the wellbore, an imaging system operable for capturing image data of particles carried by the wellbore fluid from the wellbore and a controller operably coupled to the imaging system to receive images of the particles therefrom, to measure the images of the particles to determine a size and shape of the particles, to determine a particle velocity for each of the particles within the wellbore from the size and shape determined, determine an origin of each of the particles from within the wellbore from the particle velocity determined and to adjust at least one parameter of a wellbore operation in response to the origin determined for at least one of the particles.

In one or more embodiments, the wellbore system further includes a downhole sensor disposed within the wellbore and operably coupled to the controller to transmit data indicative of at least one of the group consisting of a trajectory of the wellbore and a viscosity, density and/or fluid velocity of the wellbore fluid within the wellbore. The wellbore system may further include a drill string extending into the wellbore, and the downhole sensor may be carried by the drill string.

In some embodiments, the controller includes a neural network trained with calibration objects of a known shape, size, weight and volume to assist the controller in determining the size, shape, weight and/or density of the particles. The controller may include a processor operable to determine the particle velocity for each of the particles from a fluid velocity of the wellbore fluid and from a settling velocity characterizing a component of the particle velocity caused by gravity on each of the particles. The controller may include logic operable to select data from the imaging system for processing.

According to another aspect, the disclosure is directed to a non-transitory, computer readable medium. The non-transitory, computer readable medium is programmed with computer executable instructions that, when executed by a processor of a computer unit, perform the steps of (a) receiving images of particles retrieved from a wellbore, (b) measuring the images of the particles to determine a size and shape of the particles (c) determining a particle velocity for each of the particles within the wellbore from the size and shape of each of the particles and from a fluid velocity of a wellbore fluid within the wellbore (d) determining an origin of each of the particles from within the wellbore from the particle velocity of each of the particles and (e) adjusting at least one parameter of a wellbore operation in response to determining the origin of at least one of the particles.

In one or more embodiments, the instructions further cause the processor to determine a settling velocity for each of the particles from the size and shape of the particles. The instructions may further cause the processor to determine the particle velocity of each of the particles for each of a plurality of time intervals and estimating a location of the particles at a beginning of each of the intervals from the particle velocity determined for each of the intervals. The instructions may further cause the processor to determine the particle velocity based on a verticality of the portion of the wellbore in which the particle moves over each of the intervals.

The Abstract of the disclosure is solely for providing the United States Patent and Trademark Office and the public at large with a way by which to determine quickly from a cursory reading the nature and gist of technical disclosure, and it represents solely one or more examples.

While various examples have been illustrated in detail, the disclosure is not limited to the examples shown. Modifications and adaptations of the above examples may occur to those skilled in the art. Such modifications and adaptations are in the scope of the disclosure.

What is claimed is:

1. A method for evaluating and altering a wellbore operation, the method comprising:

circulating a wellbore fluid through a wellbore, the wellbore fluid carrying a plurality of particles originating from within the wellbore;

retrieving the particles from the wellbore;

measuring the particles to determine a size and shape of the particles;

determining, for each of a plurality of time intervals, a particle velocity for each of the particles within the wellbore from the size and shape determined for each of the particles and from a fluid velocity of the wellbore fluid within the wellbore;

determining an origin of each of the particles from within the wellbore from the particle velocity determined for each of the particles, wherein determining the origin includes estimating a location of the particles at a beginning of each time interval of the plurality of time intervals from the particle velocity determined for each time interval; and adjusting at least one parameter of the wellbore operation in response to the origin determined for at least one of the particles.

2. The method of claim 1, further comprising capturing image data of the particles with an imaging system coupled to a controller, and wherein measuring the particles includes measuring the particles from the image data with the controller.

3. The method of claim 2, wherein determining the particle velocity for each of the particles includes determining a settling velocity for each of the particles with the controller, and wherein determining the settling velocity comprises characterizing a component of the particle velocity caused by gravity on the particle.

4. The method of claim 3, wherein determining the settling velocity includes calculating the settling velocity from the equation:

$$v_s = 120.0\left(\frac{\mu_e}{d\rho_f}\right)\left[\sqrt{1 + 0.0727d\left(\frac{\rho_p}{\rho_f} - 1\right)\left(\frac{d\rho_f}{\mu_e}\right)^2} - 1\right]$$

wherein $\mu_e$, is an effective viscosity for the wellbore fluid, d is a nominal diameter of the particle, $\rho_f$ is a density of the wellbore fluid and $\rho_p$ is a density of the particle.

5. The method of claim 4, further comprising estimating the density of the particle by comparing the image data with image data of a plurality of calibration particles of known density stored by the controller.

6. The method of claim 2, further comprising recording a pump schedule including time intervals in which a pump is running to circulate the wellbore fluid and time intervals in which the pump is not running.

7. The method of claim 6, further comprising recording a trajectory of the wellbore with the controller, the trajectory indicating a degree of verticality of the wellbore, and wherein the determining the particle velocity for each of the particles is based on the degree of verticality of the wellbore.

8. The method of claim 7, wherein determining the particle velocity includes correcting the particle velocity in vertical portions of the wellbore such that the particle velocity in the vertical portions of the wellbore is less than the particle velocity in horizontal portions of the wellbore.

9. The method of claim 1, wherein adjusting at least one parameter of the wellbore operation includes initiating a washout procedure in response to identifying an indication of a buildup of particles within the wellbore.

10. A wellbore system, comprising:

a pump fluidly coupled to a wellbore and operable for circulating a wellbore fluid through the wellbore;

an imaging system operable for capturing image data of particles carried by the wellbore fluid from the wellbore; and a controller operably coupled to the imaging system to:

receive images of the particles therefrom;

measure the images of the particles to determine a size and shape of the particles;

determine, for each of a plurality of time intervals, a particle velocity for each of the particles within the wellbore from the size and shape determined;

determine an origin of each of the particles from within the wellbore from the particle velocity determined, wherein determining the origin includes estimating a location of the particles at a beginning of each time interval of the plurality of time intervals from the particle velocity determined for each time interval; and adjust at least one parameter of a wellbore operation in response to the origin determined for at least one of the particles.

11. The system of claim 10, further comprising a downhole sensor disposed within the wellbore and operably coupled to the controller to transmit data indicative of at least one of the group consisting of a trajectory of the wellbore and a viscosity, density and/or fluid velocity of the wellbore fluid within the wellbore.

12. The system of claim 11, further comprising a drill string extending into the wellbore and wherein the downhole sensor is carried by the drill string.

13. The system of claim 10, wherein the controller includes a neural network trained with calibration objects of a known shape, size, weight and volume to assist the controller in determining the size, shape, weight and/or density of the particles.

14. The system of claim 10, wherein the controller includes a processor operable to determine the particle velocity for each of the particles from a fluid velocity of the wellbore fluid and from a settling velocity characterizing a component of the particle velocity caused by gravity on each of the particles.

15. The system of claim 10, wherein the controller includes logic operable to select data from the imaging system for processing.

16. A non-transitory, computer readable medium programmed with computer executable instructions that, when executed by a processor of a computer unit, perform the steps of:

receiving images of particles retrieved from a wellbore;

measure the images of the particles to determine a size and shape of the particles;

determine, for each of a plurality of time intervals, a particle velocity for each of the particles within the wellbore from the size and shape of each of the particles and from a fluid velocity of a wellbore fluid within the wellbore;

determine an origin of each of the particles from within the wellbore from the particle velocity of each of the particles, wherein determining the origin includes estimating a location of the particles at a beginning of each time interval of the plurality of time intervals from the particle velocity determined for each time interval; and adjust at least one parameter of a wellbore operation in response to determining the origin of at least one of the particles.

17. The non-transitory, computer readable medium of claim 16, wherein the instructions further cause the processor to determine a settling velocity for each of the particles from the size and shape of the particles.

18. The non-transitory, computer readable medium of claim 16, wherein the instructions further cause the processor to determine the particle velocity based on a verticality of a portion of the wellbore in which the particle moves over each time interval of the plurality of time intervals.

* * * * *